Feb. 20, 1940. J. J. MORRIS 2,191,285
COOKING APPARATUS
Filed Aug. 9, 1937 2 Sheets-Sheet 1
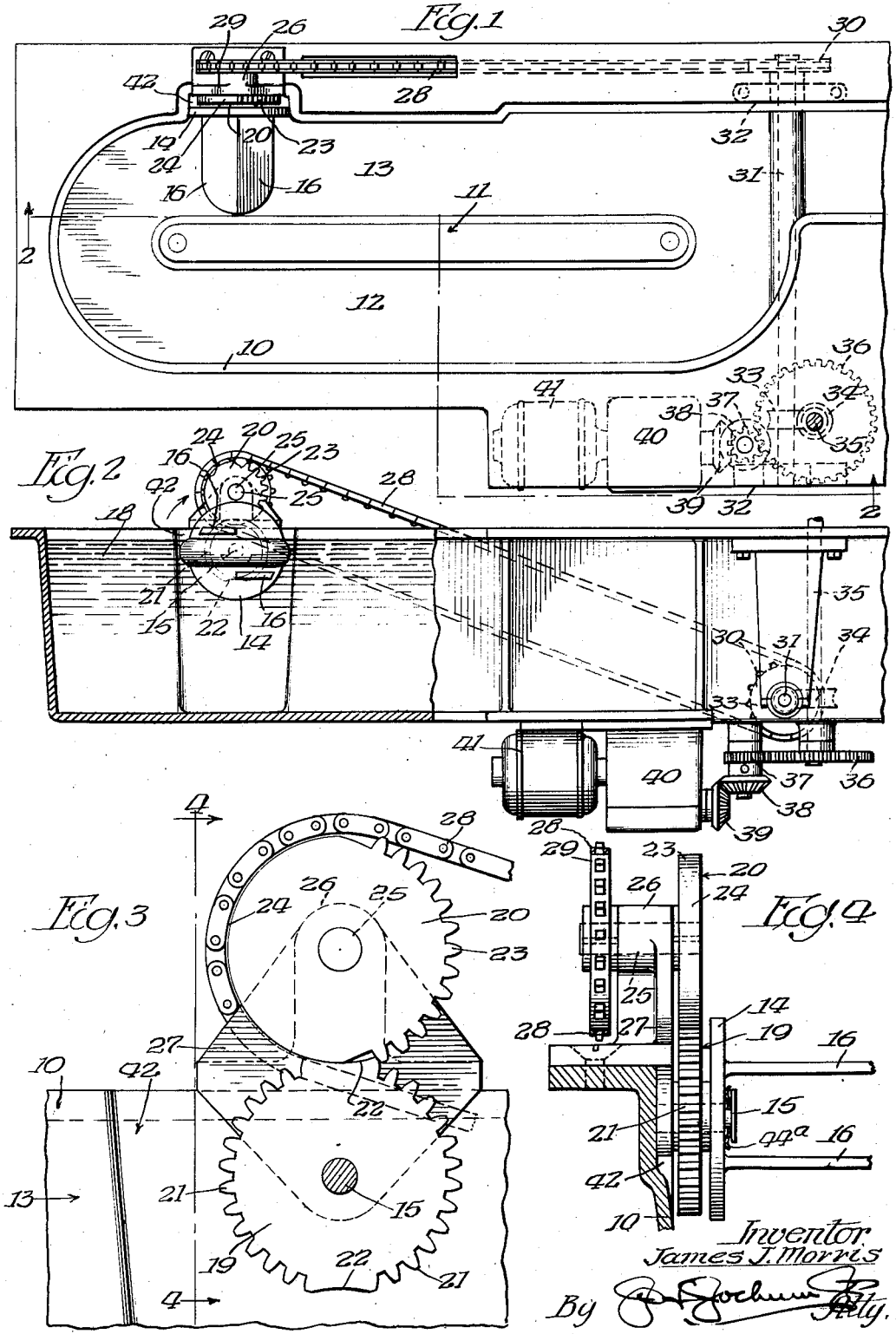

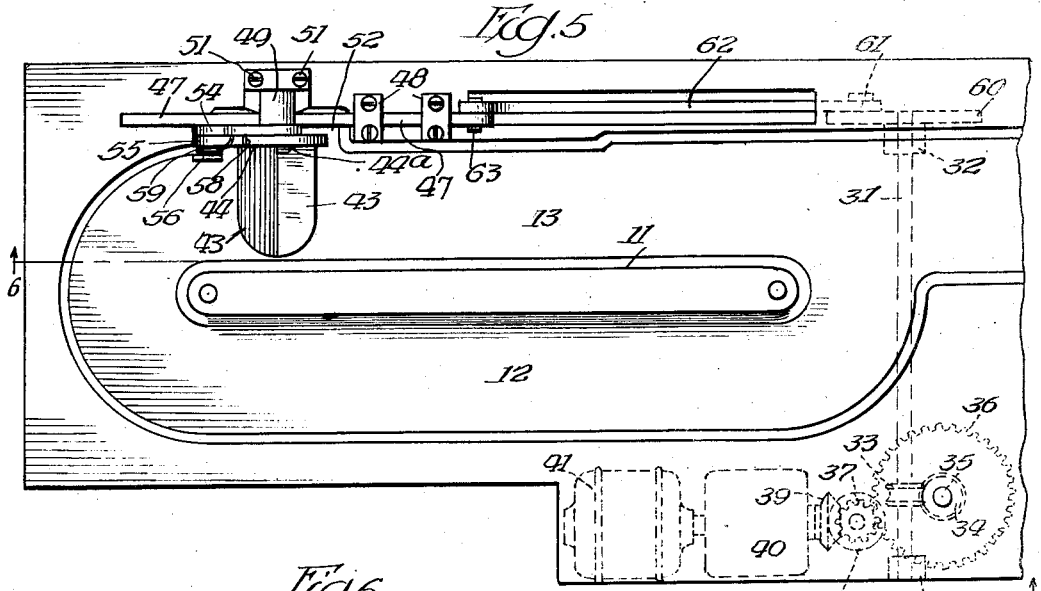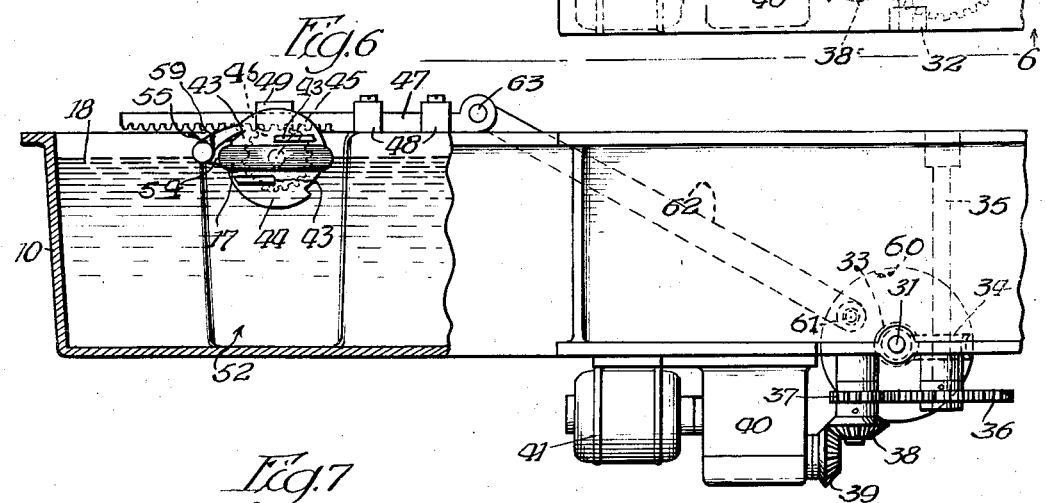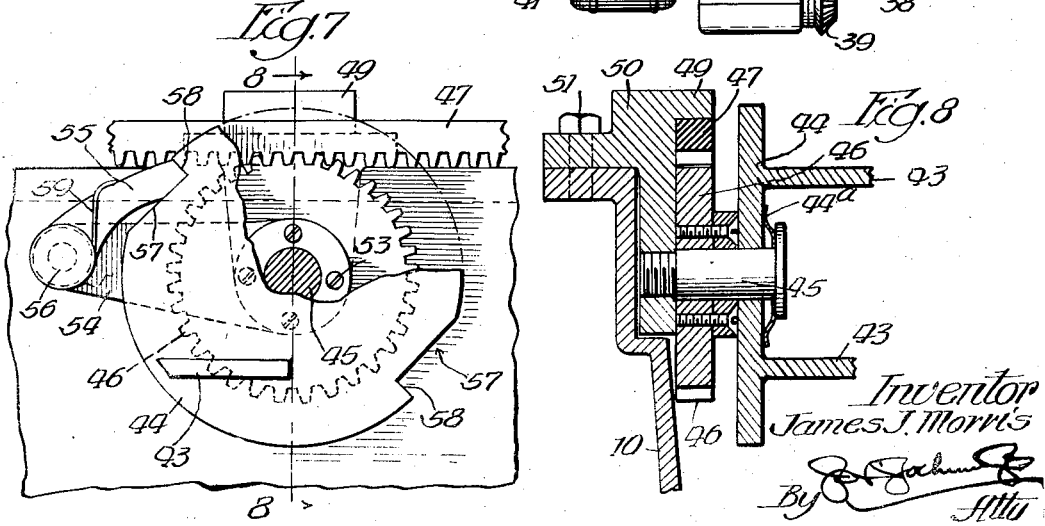

Patented Feb. 20, 1940

2,191,285

UNITED STATES PATENT OFFICE 2,191,285

COOKING APPARATUS

James J. Morris, Chicago, Ill., assignor to Theodore J. Morris, Chicago, Ill.

Application August 9, 1937, Serial No. 158,071

12 Claims. (Cl. 53—7)

This invention relates in general to improvements in cooking apparatus, but more specifically to the mechanism for turning over the article, at predetermined stages in the cooking operation.

In my application for United States Letters Patent filed April 24, 1937, Serial Number 138,761, there is shown and described a cooking apparatus embodying a pan or receptacle which contains the hot cooking liquid into which the articles are deposited and through which they are progressed during the cooking operation.

The present invention is particularly adapted, though not necessarily limited in its use, in the above referred to machine, and is designed to operate automatically and intermittently as the articles are being cooked in the hot cooking liquid, and one of the objects of the invention is to provide improved turning mechanism of this character, which will be simple, durable, cheap and compact in construction and effective and efficient in its operation.

To the attainment of these ends and the accomplishment of other new and useful objects as will appear, the invention consists in the features of novelty in substantially the construction, combination and arrangement of the several parts, hereinafter more fully described and claimed and shown in the accompanying drawings illustrating this invention, and in which Figure 1 is a top plan view of mechanism of this character constructed in accordance with the principles of this invention, and showing the same as used in conjunction with a cooking pan or receptacle similar to that shown in my above referred to patent application.

Figure 2 is a vertical sectional view taken on line 2—2 Figure 1.

Figure 3 is a detail side elevation, on an enlarged scale, of one form of mechanism for operating the turning device.

Figure 4 is a detail view, partly in elevation and partly in section, taken on line 4—4 Figure 3.

Figure 5 is a view similar to Figure 1 of a modified form of the invention.

Figure 6 is a detail vertical sectional view taken on line 6—6 Figure 5.

Figure 7 is a detail view, partly in side elevation, partly in section and partly broken away, on an enlarged scale, of a portion of the mechanism for actuating the turning device shown in Figures 5 and 6.

Figure 8 is a detail vertical sectional view taken on line 8—8 Figure 7.

In the present adaptation of the invention the numeral 10 designates generally a receptacle for holding the cooking liquid through which the articles being cooked are progressed and preferably embodies a partition 11 dividing the receptacle into communicating channels 12—13.

The article being cooked is deposited into this receptacle and is advanced through the liquid while it is being cooked.

At a predetermined point in the path of movement of the articles they are turned over so as to complete the cooking operation. In the present form of the invention, the turning mechanism consists of a support 14 (referring to the form of the invention shown in Figures 1 to 4) of any desired or suitable configuration but preferably in the form of a disc which is mounted to rotate about a horizontal axis 15. Secured to and projecting laterally from one face of the disc and so as to extend into one of the channels 12—13, preferably substantially entirely there-across, are blades or paddles 16 which are spaced one above the other and between which paddles the article 17 is adapted to be positioned as the article floats in the cooking liquid 18. These paddles 16 may be of any desired size and configuration and may be arranged in any suitable manner with respect to each other but they are preferably so arranged and so constructed that they will project on opposite sides of the axis 15 of the rotatable member 14, as shown more clearly in Figure 2.

As the article is being conveyed through the cooking liquid, and as they approach the turning device, the blades 16 will be so positioned that the article 17 will float therebetween. At this time the turning device will be rotated about the axis 15 of the member 14 so as to turn or invert the article. By the arrangement of the paddles 16 to project beyond opposite sides of the axis 15, the article will be held against slipping while being turned and a more effective turning will be accomplished. It will also be manifest that the paddles 16 are so arranged that the article while being turned is not entirely removed from the cooking liquid.

Any suitable means may be provided for intermittently and automatically operating the turning device.

In the form of the invention shown in Figures 1 to 4 this may be accomplished by a locking gear mechanism embodying two gear elements 19—20. The gear element 19 rotates upon the axis 15 and in the present exemplification of the invention is provided with spaced series of teeth 21 separated by surfaces 22 and constitutes a driven element. The other gear element 20 is provided with a series of teeth 23 encompassing only a portion of its periphery and constitutes a driving element. The remaining portion 24 of the periphery of the element 20 is smooth and untoothed and cooperates with the surfaces 22 of the element 19 to lock the element 19 as well as the turning device 14—16 against rotation, while the article is being moved into and out of the space between the paddles 16. The element 20 is provided with a shaft 25 journaled in a suitable bearing 26 to rotate upon a horizontal axis, and if desired a supporting or reinforcing plate or member 27 may be provided for maintaining the parts in proper relative position.

The element 20 may be driven or rotated in any desired or suitable manner but preferably by means of an actuating sprocket chain or belt 28 which passes over a sprocket wheel 29 that is secured to the shaft 25 of the element 20. This sprocket chain also passes over another sprocket wheel 30 mounted upon a shaft 31 journaled in suitable bearings 32 and to which shaft 31 is secured a spiral gear 33. The spiral gear meshes with another spiral gear 34 secured to a shaft 35. Secured to the shaft 35 is a gear 36 which meshes with a pinion gear 37. A bevel gear 38 is connected with the gear 37 for rotation therewith and the bevel gear 38 meshes with a bevel gear 39 forming a portion of a speed reduction mechanism diagrammatically illustrated at 40. Motion is obtained for driving the gear 39 from a suitable motor 41.

With this construction the motor 41 will impart a continuous rotation to the shaft 31 and through the medium of the sprocket chain 28 the driven gear element 20 will be rotated. As the teeth 23 of the element 20 mesh with the teeth 21 of the element 19, rotary motion will be imparted to the member 19 and so long as the teeth 23 remain in mesh with the teeth 21 the element 19 will be rotated. When, however, the smooth surface 24 of the gear element 20 contacts with a smooth surface 22 of the gear element 19 the latter will be held against rotation until the teeth 23 are again brought into mesh with the teeth 21.

During the time that the gear element 19 is locked against rotation, the paddles 16 will assume the position shown in Figure 2 so that the article 17 may be positioned between or removed from between the paddles 16.

During the time that the gear element 19 is being rotated, the paddles 16 will invert or turn over the article 17 therebetween.

In order that the channel 13 will not be obstructed by the member 14 and the actuating mechanism, these parts, or at least the member 14 and the members 19 and 20 may be disposed in a recessed portion 42 in one of the walls of the channel.

In the form of the invention shown in Figures 5 to 8 the paddles 43, corresponding to the paddles 16, are supported by a member 44 which is rotatable about a horizontal axis 45 and secured to and for rotation with the member 44 and about the axis 45, is a driven gear 46 with which the teeth of an actuating rack bar 47 mesh. The rack bar slides in suitable guideways 48 and also preferably beneath an overhanging ledge 49 of a member 50, a portion of which latter preferably forms a support to which the axle 45 about which the gear 46 and member 44 rotate, is secured. This member 50 may itself be removably secured to a portion of the wall of the channel 10, and the member 44 and gear 46 may preferably be arranged in a recessed portion 52 in the wall of the channel.

Secured to the gear 46 to rotate therewith, and by means of suitable fastening bolts 53, is an arm 54 to which a pawl 55 is pivotally connected as at 56. In the periphery of the member 44 is arranged recess 57 providing shoulders 58 with which the end of the pawl 55 co-operates, a spring 59 tending normally to cause the end of the pawl 55 to contact the periphery of the member 44.

The shoulders 58 are so arranged that upon each complete cycle of operation of the gear 46, the arm 54 and the pawl 55, in one direction, the member 44 will be rotated substantially 180° so as to completely invert or turn over the article which is between the paddles 43.

Obviously any number of shoulders 58 may be provided according to the extent of rotation that it is desired to impart to the member 44 upon the operation of the rack bar 47.

A reciprocatory movement may be imparted to the rack bar 47 in any desired or suitable manner but preferably from the motor 41 through the reduction gear mechanism 40 and the bevel gear 39, which latter meshes with the bevel gear 38 to rotate the pinion 37 that is secured to the gear 38 for rotation therewith. The pinion gear 37 meshes with the gear 36 on the shaft 35 and the shaft 35 through the medium of the spiral gear 34 meshing with the spiral gear 33, rotates the shaft 31. Secured to the shaft 31 is a disc or crank 60 and pivotally connected to the disc or crank 60, as at 61, is one end of a link 62, the other end of the link 62 being pivotally connected as at 63 with the rack bar 47.

Thus upon operation of the motor 41 the shaft 31 will be rotated and the rotation of this shaft 31 will in turn impart a reciprocatory movement to the rack bar 47. Upon the movement of the rack bar 47 backwardly, or to the right, in Figure 6, the member 44 will be rotated by reason of the engagement of the end of the pawl 55 with one of the shoulders 58. The rotation of this member 44 will continue while the rack bar 47 is being moved in this direction, and until the other shoulder 58 has assumed a position to be engaged by the pawl 55 upon the next backward stroke of the rack bar 47. The movement of the rack bar will then be reversed, causing the pawl 55 to travel over the periphery of the member 44 and into a position to engage another shoulder 58 upon the next backward movement of the rack bar.

Thus it will be seen that when the article 17 is positioned between the paddles 43, and the member 44 and paddles 43 are rotated about the axis 45, the article will be completely inverted in the cooking liquid 18, and the member 44 and paddles 43 will remain at rest until the rack bar is again moved so as to cause the pawl 55 to be positioned to engage another of the shoulders 58.

If desired and in order to prevent overthrow of the member 44 and paddles 43, a suitable friction creating device 44—A may be provided, or any other suitable means may be employed for that purpose.

While the preferred forms of the invention have been herein shown and described, it is to be understood that various changes may be made in the details of construction and in the combination and arrangement of the several parts, within the scope of the claims, without departing from the spirit of this invention.

What is claimed as new is:

1. A cooking apparatus embodying a receptacle for the cooking liquid, and through which liquid the articles are progressed while being cooked, means for turning over the articles, the said means embodying a member rotatable on a horizontal axis, a paddle carried by and projecting laterally from said member in a direction lengthwise of the axis of the member, and means for rotating said member and with it said paddle, the last said means embodying a pawl and ratchet construction.

2. A cooking apparatus embodying a receptacle for the cooking liquid, and through which liquid the articles are progressed while being cooked, means for turning over the articles, the said means embodying a member rotatable on a horizontal axis, a paddle carried by and projecting laterally from said member in a direction lengthwise of the axis of the member, means for rotating said member and with it said paddle, the last said means embodying a gear and rack, and a pawl and ratchet connection between said gear and said member.

3. A cooking apparatus embodying a receptacle for the liquid in which the articles are cooked, means for turning over the articles, said means embodying as a unitary structure a bracket, a member supported by the bracket for rotation about a horizontal axis and a projection extending laterally from said member in a direction lengthwise of the axis thereof, means also held by said bracket and in direct connection with and for imparting a step by step rotation to said member, and means for actuating the last said means, the said bracket being mounted directly upon a wall of the said receptacle to position said turning member within the receptacle.

4. A cooking apparatus embodying a receptacle for the liquid in which the articles are cooked, means for turning over the articles, said means embodying as a unitary structure a bracket, a member supported by the bracket for rotation about a horizontal axis and spaced projections extending laterally from said member in directions lengthwise of the axis thereof and laterally offset with respect to each other, means also held by said bracket and in direct connection with and for imparting a step by step rotation to said member, and means for actuating the last said means, the said bracket being mounted directly upon a wall of said receptacle to position said turning member within the receptacle.

5. A cooking apparatus embodying a receptacle for the liquid in which the articles are cooked, means for turning over the articles, said means embodying as a unitary structure a bracket, a member supported by the bracket for rotation about a horizontal axis and a projection extending laterally from said member in a direction lengthwise of the axis thereof, means also held by said bracket for imparting a step by step rotation to said member, and means for actuating the last said means, the said bracket being mounted directly upon a wall of the said receptacle to position said turning member within the receptacle, the inner face of said wall being provided wth a recessed portion in which a portion of said bracket is disposed.

6. As a unitary structure a turning mechanism for turning articles in a cooking receptacle, said mechanism embodying a bracket, a turning member supported by the bracket for movement on a horizontal axis and a projection extending laterally from the member in a general direction lengthwise of the axis, of said member, means also held by the bracket and in direct connection with and for imparting a step by step rotation to said member, means for securing the bracket to the wall of the cooking receptacle, and means for imparting motion to the first recited means.

7. As a unitary structure a turning mechanism for turning articles in a cooking receptacle, said mechanism embodying a bracket, a turning member supported by the bracket for movement on a horizontal axis and a projection extending laterally from the member in a general direction lengthwise of the axis of said member, means also held by the bracket for imparting a step by step rotation to said member, means for securing the bracket to the wall of the cooking receptacle, and means for imparting motion to the first recited means, the step by step rotation imparting means embodying a locking gear structure.

8. As a unitary structure a turning mechanism for turning articles in a cooking receptacle, said mechanism embodying a bracket, a turning member supported by the bracket for movement on a horizontal axis and a projection extending laterally from the member in a general direction lengthwise of the axis of said member, means also held by the bracket for imparting a step by step rotation to said member, means for securing the bracket to the wall of the cooking receptacle, and means for imparting motion to the first recited means, the step by step rotation imparting means embodying a pawl and ratchet mechanism.

9. A cooking apparatus embodying a receptacle for the cooking liquid through which the articles are progressed, means for turning over the articles, said means embodying a member rotatable on a horizontal axis and a projection extending laterally from said member in a direction lengthwise of the axis of the member, means embodying a locking gear mechanism for rotating said member and with it the said projection, one of the elements of said mechanism being connected directly with said member for rotation therewith, a driving element associated with the other element of the said mechanism, and motion imparting means associated with said driving element.

10. As a unitary structure a turning mechanism for turning articles in a cooking receptacle, said mechanism embodying a bracket, a turning member supported by the bracket for movement on a horizontal axis and a projection extending laterally from the member in a general direction lengthwise of the axis of said member, means also held by the bracket for rotating said member, said bracket mounted upon a wall of the receptacle, the said means embodying a Geneva element in direct connection with said member, and means for actuating said element.

11. As a unitary structure a turning mechanism for turning articles in a cooking receptacle, said mechanism embodying a bracket, a turning member supported by the bracket for movement on a horizontal axis and a projection extending laterally from the member in a general direction lengthwise of the axis of said member, means also held by the bracket for rotating said member, said bracket mounted upon a wall of the receptacle, the said means embodying a gear and ratchet mechanism, one of the elements of said mechanism being in direct connection with said member, and means for actuating the said element.

12. A cooking apparatus embodying a receptacle for the cooking liquid and through which liquid the articles are progressed while being cooked, means for turning over the articles, the said means embodying a member rotatable on a horizontal axis and a paddle carried by and projecting laterally from said member in a direction lengthwise of the axis of said member, means also rotatable on a horizontal axis and in direct connection with and for intermittently rotating the said member and with it said paddle, and mechanism for actuating the last said means.

JAMES J. MORRIS.